United States Patent [19]

Moulton

[11] Patent Number: 4,813,696
[45] Date of Patent: Mar. 21, 1989

[54] BICYCLE FRAME CONSTRUCTION

[75] Inventor: Alexander E. Moulton, Bradford-on-Avon, England

[73] Assignee: Alex Moulton Limited, Bradford-on-Avon, England

[21] Appl. No.: 169,581

[22] Filed: Mar. 17, 1988

[30] Foreign Application Priority Data

Apr. 15, 1987 [GB] United Kingdom ............... 8709130

[51] Int. Cl.$^4$ .............................................. B60J 25/00
[52] U.S. Cl. ............................. 280/281.1; 280/288.3
[58] Field of Search ................... 280/281 R, 278, 287, 280/291

[56] References Cited

U.S. PATENT DOCUMENTS

| | | | |
|---|---|---|---|
| 4,479,662 | 10/1984 | Defour et al. | 280/281 R |
| 4,540,190 | 9/1985 | Moulton | 280/281 R |
| 4,541,648 | 9/1985 | Tayamiya et al. | 280/281 R |
| 4,565,383 | 1/1986 | Isaac | 280/281 R |
| 4,621,827 | 11/1986 | Klein | 280/281 R |
| 4,666,175 | 5/1987 | Mueller | 280/281 R |
| 4,728,113 | 3/1988 | Thun, Jr. | 280/281 R |

Primary Examiner—Richard A. Bertsch
Attorney, Agent, or Firm—Dennison, Meserole, Pollack & Scheiner

[57] ABSTRACT

A frame for a bicycle has a head tube for housing a steering column, a seat tube surmounted by a saddle and having at its lower end a housing for a pedal crank axle, and two beams extending between the head tube and the seat tube, said beams intersecting one another so that the two beams have X-configuration when viewed in side elevation. Each beam is made from small diameter round rod element, bent to form a 'U' shaped hairpin, four of these hairpins being arranged to embrace the outsides of the head tube and the seat tube, two on each, the rod bends being rigidly attached to the tubes they embrace. These hairpins constitute the peripheral tubes of the beams of the 'X'-frame as defined at the outset, there being shear webs, in the form comprising zig-zag trusses, attached between the limbs of the hairpins; while at the nodal strong point of the cruciform X-frame, the ends of the 'U'-bent rod elements forming each hairpin, register and are fixed in holes in a transverse tube constituting a nodal kingpin. Finally, a tie rod extends, beneath the intersecting beams, between lower regions of the head and seat tubes.

3 Claims, 2 Drawing Sheets

BICYCLE FRAME CONSTRUCTION

This invention relates to a frame for a bicycle having a haed tube for housing a steering column and a seat tube surmounted by a saddle and having at its lower end a housing for a pedal crank axle, the frame comprising also two beams extending between the head tube and the seat tube, said beams intersecting one another at a nodal strong point so that the two beams have an X-configuration when viewed in side elevation, and including a tie extending, beneath the intersecting beams, between lower regions of the head and seat tubes.

Such a frame is hereinafter, to save repetition, referred to as an "X-frame"; and we have described, illustrated and claimed such an "X-frame in the specification of our British Patent No. 2,130,982,B, and in the specification of our U.S. Pat. No. 4,540,190.

In such an 'X'-frame, torsional and lateral stiffness and strength derive from the structure of the two beams themselves, with their depth in the horizontal plane; and from the fact that they intersect at a nodal strong point usually constituted by a transverse tube or kingpin which is deep in the horizontal plane thus augmenting structural strength.

The outer ends of the beams are rigidly attached to the head tube and seat tube respectively, which said head and seat tubes contribute a torsional component of stiffness between the legs of the two beams which is essential for the validity of the 'X' frame as a structure, stiff as it is torsionally about a fore and aft axis of the bicycle and laterally.

The strength of the 'X'-frame in the vertical plane is augmented by teh tie member which extends beneath the beams between the bases of the head and seat tubes, and which as a result of its being distanced vertically from and below the nodal strong point or kingpin, acts in tension to make a structure which is adequately strong in the vertical plane.

One current X-frame for a bicyclw made of small diameter hollow tubing (that is about 1.27 mm or 0.5 inch in diameter) and of light gauge (at 24 SWG; that is about 0.56 mm or 0.022 inches in tube wall thickness) constructed according to the principle of the 'X'-frame as outlined above, has measured values of torsional and lateral stiffnesses which are some 2 to 2.5 times stiffer than those of conventional so-called 'diamond' shaped bicycle frames employing equivalent tubing.

The kingpin at the nodal strong point, and the lower tie member, may conveniently, each be separable so as to enable the frame to be separated into two front and rear frame halves, for easier stowage. Such a separable version is the subject of British Patent specification No. 2,130,981,B, (and is described illustrated and claimed in the specification of our U.S. Pat. No. 4,540,190). In such a separable 'X'-frame the transverse tubular kingpin at the nodal strong point may be cut diagonally into three pieces, the two outer pieces being secured to, say, the rear frame half and the inner piece being secured to, say, the front frame half, with the three pieces being held axially aligned and united by an axial tie bolt which is removable when the two frame sections are to be separated.

The present invention now to be described relates to an 'X-frame' for a bicycle, whether separable or not, and in particular it relates to a method of construction to make manufacture of such an 'X-frame easier, involving fewer parts and operations.

According to this invention in such an 'X'-frame, a small diameter round rod element, which may be hollow tubing or a solid bar, is cut to length and bent to form a 'U' shaped hairpin, and four of these hairpins are arranged to embrace the outsides of a head tube and a seat tube, two on each, and are rigidly attached thereto by brazing, welding or adhesive; these hairpins constituting the peripheral tubes of the beams of the 'X'-frame as defined at the outset; there being shear webs, preferably in the form comprising zig-zag trusses, attached between the limbs of the hairpins; while at the nodal strong point of the cruciform X-frame, the ends of the 'U'-bent rod elements forming each hairpin register in holes in a transverse tube constituting the nodal kingpin; and these ends are rigidly attached in these holes by brazing, welding or adhesive.

The depth of these holes in the nodal kingpin is deep enough to accomodate some tolerance in the cut-off length of the rod before it is 'U'-bent into a hairpin.

The diameter of the 'U'-bent rod forming each hairpin may be specifically small, at not more than say 12 mm, and where hollow steel tubing is used this may be of heavy gauge, of up to say 1.25 mm in tube wall thickness. This is to be compared with the hollow tubing previously employed as referred to above and which is greater in diameter, and of lesser tube wall thickness.

The use of small diameter rod as now proposed, facilitates the bending into the hairpin of 'U' shape and so-called "crush" forming, in which the inside of the bend radius is flattened, can be used.

The spans of the beams, constituting the 'X' configuration, are kept short (at about 270 mm) by centralising (or nearly so) the position of the nodal kingpin, within the longitudinal dimension of the 'X'-frame. This shortness of span affords structural strength and stability to the frame elements, and this shortness of span also contributes adequate structural strength and stiffness, against loading of the frame in the vertical direction.

Also in previous frame constructions the small tubes making up the frame often required miterd ends at many of the tube junctions needed in that frame. Such mitering is unnecessary in the construction now proposed.

Tests and theory confirm that using values as above the satisfactory service performance of the 'X'-frame in regard to strength and stiffness, as compared with conventional "diamond" frames, is at least equalled in the frame now proposed with its 'U'-bent hairpins.

In the case that the new frame is to be rendered separable or demountable, the transverse tube constituting the kingpin may be formed so as to be splittable into three sections, the outer two being attached say to the front pair of hairpins, and the centre section attached to the rear pair of hairpins. The kingpin so split may be united or tied together by an axial through-bolt. The frame, separable into front and rear halves, is completed, insofar as vertical strength is concerned, by the tie rod extending between the base of head tube and the bottom of the seat tube, and this tie rod is also demountable.

A preferred embodiment of the invention as applied to a bicycle frame which is separable into two parts will be described by way of example with reference to the accompanying drawings.

Figure 1:
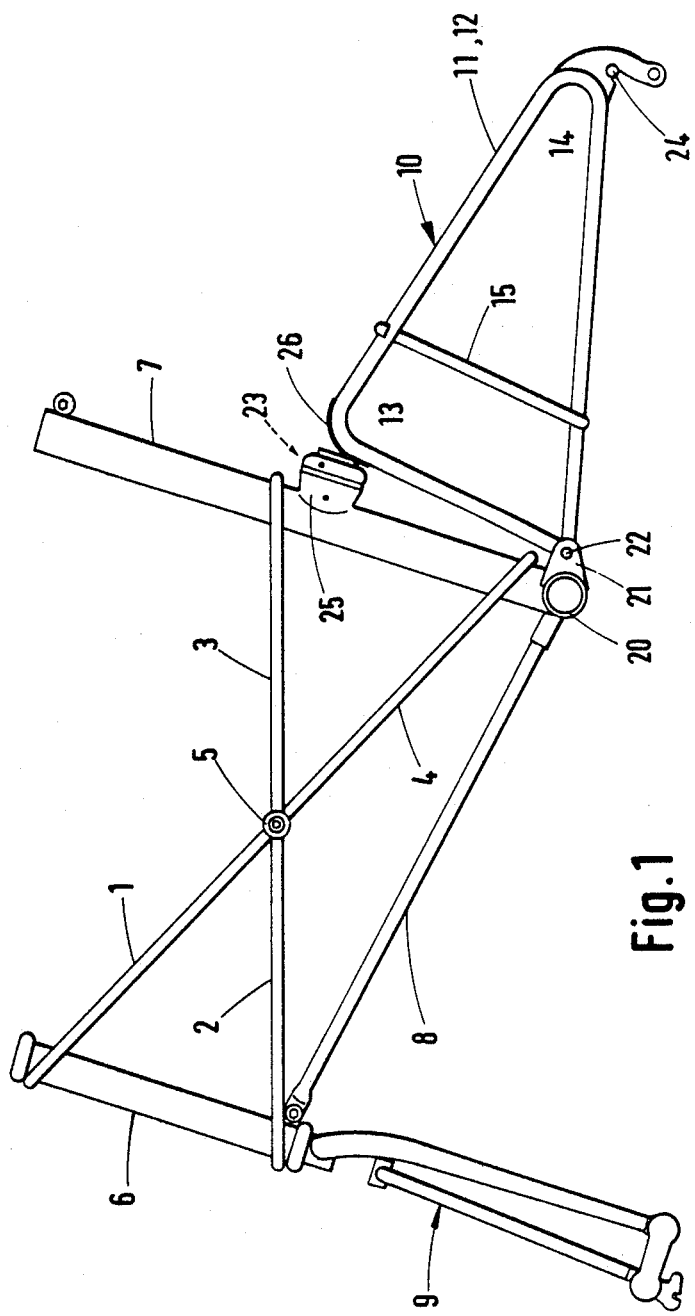
FIG. 1 is a side view of an embodiment of a frame according to the invention.

Referring first to FIG. 1; four 'U'-bent rods (hereinafter referred to as "hairpins") 1, 2, 3 and 4, are connected to a transverse tube in the form of a kingpin 5 in such a way as to form an 'X'-frame. The "hairpins" 1 and 2 embrace a head tube 6 for housing a steering column carrying front wheel forks (not shown in any detail, but generally designated 9). The "hairpins" 3 and 4 embrace a seat tube 7 for housing a saddle stem. At its lower end the seat tube will mount a transverse tube 20 as will be described below.

Figure 2:
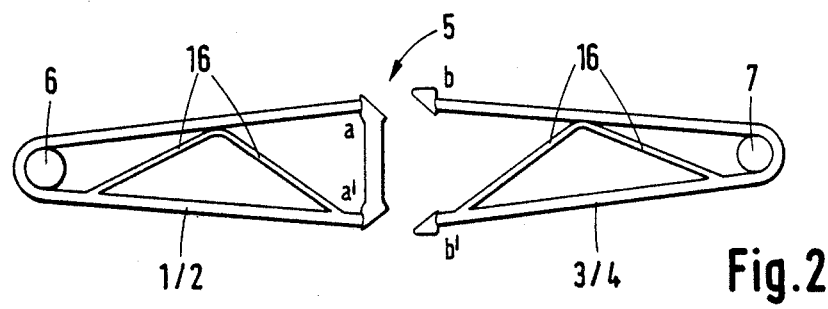
FIG. 2 is a plan view of separated "hairpins" ½ and ¾ shown in FIG. 1.
Figure 3:
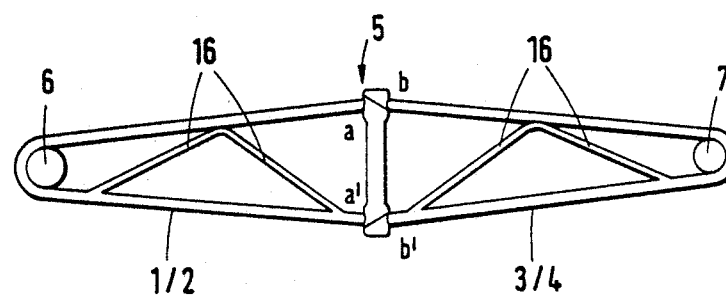
FIG. 3 is a plan view of united "hairpins" ½ and ¾ shown in FIG. 1.

As shown in FIGS. 2 and 3 the head tube 6 nests in the 'U'-bends of the "hairpins" 1 and 2 towards its upper and lower ends respectively. Similarly, the seat tube 7 nests in the 'U'-bends of "hairpins" 3 and 4 towards its intermediate and lower parts respectively. The head tube 6 and seat tube 7 are rigidly attached or secured to their respective positions on the "hairpins" 1, 2, 3 and 4 by brazing, welding or adhesive.

Shear webs in the form of zig-zag bracing trusses 16 are attached between the limbs of the "hairpins" ½, ¾ as shown (FIGS. 2 and 3), and serve to maintain these limbs in the desired spaced apart configuration.

The frame illustrated is separable into front and rear sections. In order to achieve this, a separable four-piece kingpin 5 is provided at the node where the beams, when viewed from the side, intersect in X-configuration. FIG. 2 shows the "hairpins" ½ and ¾ separated and FIG. 3 shows them united.

The nodal kingpin 5 comprises three tube elements b, b' and a/a'. Two outer tube elements b and b' are attached to the front two "hairpins" 1 and 2, and the central tube element a/a' is attached to the rear two "hairpins" 3 and 4. The outer b/b' and central a/a' tube elements of the kingpin 5 so split, can be secured together by an axial through-bolt (not shown in FIG. 1). The kingpin 5 augments the horizontal transverse bracing function performed by the trusses 16, as well as contributing significantly to the structural stiffness of the frame as a whole.

In the secured position the "hairpins" describe an 'X'; the angle between "hairpins" 1 and 2, and the angle between "hairpins" 3 and 4, being approximately 45°, while the angle between the hairpins 1 and 3, when the front and rear frame sections are united, is approximately 135°.

Also shown in FIG. 1 is a tube 8 comprising a lower tie member of the 'X'-frame as described above and which affords vertical strength to the frame and is also demountable. The tie member 8 is a rod which is detachably secured on the one hand to the lower end of the head tube 6 and on the other hand to the lower end of the seat tube 7.

At the base of the seat tube 7 is rigidly fixed a hollow tube 20 extending transversely of the frame and which constitutes a housing for a pedal crank axle (not shown) and usually termed "bottom bracket" which will be arranged supported for rotation in a manner well known to those skilled in the art. Two lugs 21 extend rearwardly from the tube 20 and mount a pivot pin 21 for a trailing arm structure generally designated 10 in FIGS. 1, 4 and 5.

The trailing arm structure generally designated 10 is arranged to support a rear cycle wheel (not shown but whose spindle can be seen at 24 in FIG. 1). The trailing arm structure 10 pivotting about the pin 22, abuts against a bracket 25 affixed to the rear of the seat tube 7 through the medium of an interposed resilient buffer generally designated 23. A extensible or contractable screw fixing can be interposed between the top of the structure 10 and the buffer 23. This can conveniently be manually operated by the user to adjust the attitude of the bicycle on the road, thereby influence handling behaviour to taste.

The trailing arm structure 10 is constituted by twin rod elements 11, 12 bent and formed into two identical triangular elements, with sharp bends at the top and rear as shown at 13 and 14. A 'Z'-shaped tie member 15 provides lateral stiffening and holds the elements 11 and 12 correctly spaced apart on each side of the rear wheel (whose spindle is shown at 24 in FIG. 1). Alternatively, the tie member 15 may be generally of X-configuration.

Figure 4:
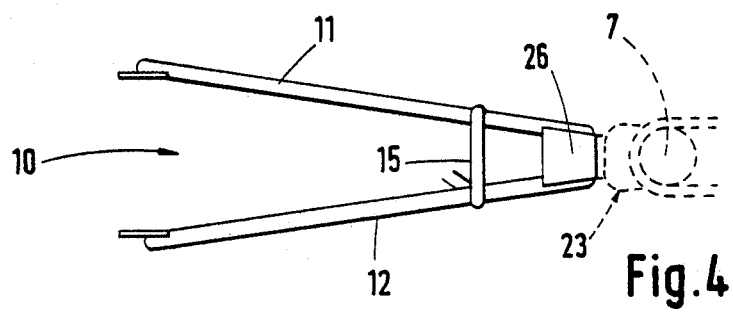
FIG. 4 is a plan view from above of a trailing arm for the rear wheel.

FIG. 4 is a plan view showing the two triangular shaped tubes 11, 12 abutting the bracket 25 at the rear of the seat tube 7 with the resilient buffer 23 interposed. Part of the 'Z'-shaped tie member is also shown and additional transverse stiffness is afforded by a plate 26 which functions also as a reaction member engaging the buffer 23.

Figure 5:
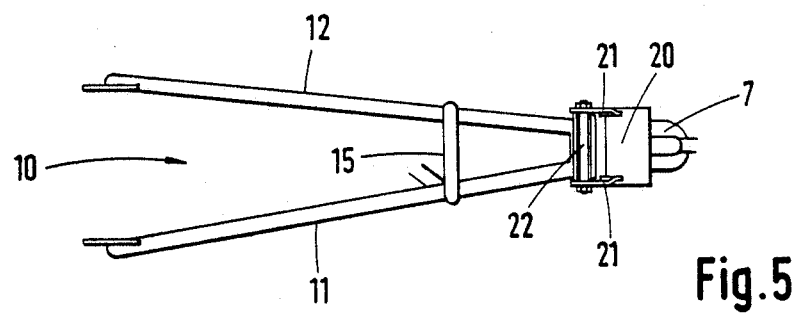
FIG. 5 is a plan view from below of a trailing arm for the rear wheel.

FIG. 5 showing the rear trailing arm structure 10 from beneath, depicts the two triangular shaped tubes 11 and 12 as pivotally connected to the pivot pin 22 mounted, with the aid of the lugs 21, on the transverse tube 20 fixed at lower end of the seat tube 7 as described above.

The bent rods used to form the hairpins 1, 2, 3 and 4 and the trailing arm element 11 and 12, may be made up from solid bar whether of steel or of aluminium, but preferably, the bent rod elements are made from hollow steel tubing of a diameter of say 9 mm to 15 mm inclusive, and having a wall thickness which is not more than 1.25 mm. Tubing which is similar but of smaller size, may be employed for the trusses 15 and 16 and for the tie rod 8. The head and seat tubes 6 and 7 together with the housing 20, being of much larger diameter (of 30 to 50 mm), may conveniently be made from tubing having lower wall thickness, as compared with the thick walled tubing used for the bent hairpins and the bent elements of the rear trailing arm structure. All other metal elements of the frame are preferably of steel but in some cases where extreme lightweight is required, aluminium may be employed.

I claim:

1. A frame for a bicycle, the frame having a head tube for housing a steering column, a seat tube surmounted by a saddle and having at its lower end a housing for a pedal crank axle, and two beams extending between the head tube and the seat tube, said beams intersecting one another so that the two beams have X-configuration when viewed in side elevation, and wherein each beam is made from small diameter round rod element, bent to form a 'U'shaped hairpin,;

four of these hairpins being arranged to embrace the outsides of the head tube and the seat tube, two on each, the rod bends being rigidly attached to the tubes they embrace;

these hairpins constituting the peripheral tubes of the beams of the 'X'-frame as defined at the outset, there being shear webs, in the form comprising zig-zag trusses, attached between the limbs of the hairpins;

while at the nodal strong point of the cruciform X-frame, the ends of the 'U'-bent rod elements forming each hairpin, register and are fixed in holes in a transverse tube constituting a nodal kingpin;

and including a tie rod extending, beneath the intersecting beams, between lower regions of the head and seat tubes.

2. A frame according to claim 1 wherein each bent round rod hairpin is made from hollow steel tubing, this tubing being of a diameter of between 9 mm and 15 mm inclusive, the arms of the hairpin being arranged side by side and maintained in this location by the shear web means; and wherein the shear web means comprise short transverse braces bridging the arms of the hairpin and each constituted of hollow steel tubing, this tubing having a diameter of between 4 and 9 mm inclusive; and wherein the head and seat tubes have a diameter of between 30 and 50 mm inclusive.

3. A frame for a bicycle according to claim 1 wherein the front and rear parts of the frame are separably joined to one another by coupling means at the intersection of the beams; and wherein the tie rod is detachable from the remainder of the frame at both of its ends.

* * * * *